United States Patent [19]
Xu et al.

[11] Patent Number: 5,665,786
[45] Date of Patent: Sep. 9, 1997

[54] BIODEGRADABLE POLYESTER AND NATURAL POLYMER COMPOSITIONS AND EXPANDED ARTICLES THEREFROM

[75] Inventors: Wayne Xu, Peoria; William M. Doane, Morton, both of Ill.

[73] Assignee: Bradley University, Peoria, Ill.

[21] Appl. No.: 653,635

[22] Filed: May 24, 1996

[51] Int. Cl.$^6$ ........................................ C08J 9/00
[52] U.S. Cl. ................ 521/84.1; 524/51; 521/109.1; 521/182; 521/916
[58] Field of Search ................ 521/84.1, 109.1, 521/182, 916; 524/51

[56] References Cited

U.S. PATENT DOCUMENTS

| | | |
|---|---|---|
| 3,901,838 | 8/1975 | Clendinning et al. . |
| 3,921,333 | 11/1975 | Clendinning et al. . |
| 3,923,729 | 12/1975 | Clendinning et al. . |
| 3,931,068 | 1/1976 | Clendinning et al. . |
| 3,932,319 | 1/1976 | Clendinning et al. . |
| 3,949,145 | 4/1976 | Otey et al. . |
| 4,016,117 | 4/1977 | Griffin . |
| 4,344,857 | 8/1982 | Shasha et al. . |
| 4,483,950 | 11/1984 | Fanta et al. . |
| 4,863,655 | 9/1989 | Lacourse et al. . |
| 4,873,270 | 10/1989 | Aime et al. . |
| 4,911,952 | 3/1990 | Doane et al. . |
| 4,983,651 | 1/1991 | Griffin . |
| 5,095,054 | 3/1992 | Lay et al. . |
| 5,171,820 | 12/1992 | Mang et al. . |
| 5,183,690 | 2/1993 | Carr et al. . |
| 5,185,382 | 2/1993 | Neumann et al. . |
| 5,186,990 | 2/1993 | Starcevich . |
| 5,219,646 | 6/1993 | Gallagher et al. . |
| 5,234,977 | 8/1993 | Bastioli et al. . |
| 5,252,271 | 10/1993 | Jeffs . |
| 5,256,711 | 10/1993 | Tokiwa et al. . |
| 5,272,181 | 12/1993 | Boehmer et al. . |
| 5,292,782 | 3/1994 | Bastioli et al. . |
| 5,321,064 | 6/1994 | Vaidya et al. . |
| 5,346,936 | 9/1994 | Buehler et al. . |
| 5,360,830 | 11/1994 | Bastioli et al. . |
| 5,384,187 | 1/1995 | Uemura et al. . |
| 5,391,423 | 2/1995 | Wnuk et al. . |
| 5,412,005 | 5/1995 | Bastioli et al. . |
| 5,422,387 | 6/1995 | Toms et al. . |
| 5,439,953 | 8/1995 | Ritter et al. . |
| 5,446,078 | 8/1995 | Vaidya et al. . |
| 5,459,258 | 10/1995 | Merrill et al. . |
| 5,462,983 | 10/1995 | Bloembergen et al. . |
| 5,510,401 | 4/1996 | Dehennau et al. . |

FOREIGN PATENT DOCUMENTS

| | | |
|---|---|---|
| 93/01043 | 2/1990 | WIPO . |
| 93/11937 | 6/1993 | WIPO . |
| 93/14911 | 8/1993 | WIPO . |

OTHER PUBLICATIONS

McCarthy et al., "Recent Advances in Biodegradable Polymers and Blends," Corn Utilization Conference VI, St. Louis, Missouri, Jun. 4–6, 1996.

Shogren et al. "Biodegradable Starch–Polyester Composites," Corn Utilization Conference VI, St. Louis, Missouri, Jun. 4–6, 1996.

Koenig et al., "Biodegradable Polymer/Starch Blends, Composites, and Coatings," PMSE, 67, pp. 290–291 (1992).

Kotnis et al., "Processing and Mechanical Properties of Biodegradable Poly(hydroxybutyrate–co–valerate)–Starch Compositions," J. Environ. Polymer Degradation, 3:2, pp. 97–105 (1995).

Lim et al., "Effect of Starch Granule Size on Physical Properties of Starch–Filled Polyethylene Film," Biotechnol. Prog., 8, pp. 51–57 (1992).

Mang et al., "Synthesis and Properties of Thermoplastic Hydroxy–Functional Polyesters Derived from Diacids and Diglycidyl Ethers," Polymer Preprints, 36:2, pp. 180–181 (1995).

Shogren, R.L., "Poly(ethylene oxide)–Coated Granular Starch–Poly(hydroxybutyrate–co–hydroxyvalerate) Composite Materials," J. Environ. Polymer Degradation, 3:2, pp. 75–80 (1995).

Tiefenbacher, Karl F., "Starch–Based Foamed Materials—Use and Degradation Properties," J.M.S.—Pure Appl. Chem., A30(9 & 10), pp. 727–731 (1993).

Westhoff et al., "Starch–Polyvinyl Alcohol Films—Effect of Various Plasticizers," Starch–Stärke, 31, pp. 163–165 (1979).

Lawton & Fanta, "Glycerol–Plasticized Films Prepared from Starch—Poly(vinyl alcohol) Mixtures: Effect of Poly-(ethylene–co–acrylic Acid)," Carbohydrate Polymers, 23, pp. 275–280 (1994).

Ramsey et al., "Biodegradability and Mechanical Properties of Poly–(β–Hydroxybutyrate–Co–β–Hydroxyvalerate)–Starch Blends," Applied and Environmental Microbiology, 59:4, pp. 1242–1246 (Apr. 1993).

Shogren et al., "Development of Starch Based Plastics—A Reexamination of Selected Polymer Systems in Historical Perspective," Starch/Stärke, 45:8, pp. 276–280 (1993).

Tatarka, Paul D., "Can Agricultural Materials Compete with Expanded Polystyrene in the Loose–Fill Market?", The Plastics Challenge—A Revolution in Education, Proceedings of the SPE 53rd Annual Technical Conference & Exhibits, pp. 2225–2231 (1995).

Primary Examiner—Morton Foelak
Attorney, Agent, or Firm—Majestic, Parsons, Siebert & Hsue

[57] ABSTRACT

Expanded articles have a compressible and resilient body including two biodegradable components. One component preferably is starch or a modified starch. Another component is a water insoluble, synthetic polymer, preferably a hydroxy-functional polyester. The article may be thermoformed, and has exterior surfaces with substantial resistance to moisture.

4 Claims, 1 Drawing Sheet

FIG._1

BIODEGRADABLE POLYESTER AND NATURAL POLYMER COMPOSITIONS AND EXPANDED ARTICLES THEREFROM

This invention was made with government support under Grant Agreement No. 59-3K95-3-126 awarded by the United States Department of Agriculture/Agricultural Research Service. The government has certain rights in this invention.

FIELD OF THE INVENTION

The present invention generally relates to expanded articles, and mole particularly relates to biodegradable admixtures of hydroxy-functional polyester and natural polymers which may be expanded as resilient, compressible, low density articles that are resistant against moisture, and are useful for applications such as packaging.

BACKGROUND OF THE INVENTION

U.S. Pat. No. 4,863,655, inventors Lacourse et al., issued Sep. 5, 1989, describes the disposal problems associated with most presently used packaging materials formed from synthetic polymers. For example, although expanded polystyrene is a resilient, compressible and low density (about 0.25 lb/ft$^3$) protective packaging filler material and performs its protective function well (e.g. as the ubiquitous "peanuts"), it is not biodegradable. Thus, U.S. Pat. No. 4,863,655 also describes a biodegradable packaging material as an alternative to expanded polystyrene comprising an expanded amylose starch product. Although biodegradable, the special high amylose component used is quite expensive. Also, another difficulty with the solution described by U.S. Pat. No. 4,863,655, is that the expanded amylose starch material is not, by itself, suitable for preparing containers where moisture resistance is a necessary property (e.g. various take-out food containers).

Starch behavior during extrusion and injection molding has been the focus of considerable studies. The state of starch in these various physical changes has been described under names such as melted starch, molecularly dispersed or disrupted starch, destructured starch, and so forth. A historical review of starch transformation when extruded is described by Shogren et al., "Development of Starch-Based Plastics—A Reexamination of Selected Polymer Systems in Historical Perspective," *Starch/Stärke*, 45, pp. 276–280 (1993).

U.S. Pat. No. 5,095,054, inventors Lay et al., issued Mar. 10, 1992, describes blends of destructurized starch and one or more polymers. Although these blends and articles made therefrom are said to show an improved dimensional stability in humid air when compared with non-blended destructurized starch, nevertheless the articles are said to retain a high degree of disintegration in contact with liquid water. Although this disintegration may assist in disposal of such articles in landfills and the like, the high degree of disintegration in contact with liquid water is disadvantageous for many applications where substantial moisture is present.

U.S. Pat. No. 5,272,181, inventors Boehmer et al., issued Dec. 21, 1993, discusses starch-graft copolymers as another packaging material alternative, which materials are also said to readily disintegrate under wet conditions. Although such disintegration may assist in integrating the materials into soil, the disclosed materials are not entirely biodegradable due to the presence of the synthetic resins (such as polyacrylate). Further, as already mentioned, such a wettability property is disadvantageous for applications where moisture will be present.

U.S. Pat. No. 5,185,382, inventors Neumann et al., issued Feb. 9, 1993, describes biodegradable packagings formed from starch and a polyalkylene glycol or derivative. A preferred polyalkylene glycol is polyethylene glycol. However, use of these water soluble components mean that expanded products have little resistance to moisture. Further, the bulk density property from many Of the formulations tends to be rather high.

Accordingly, attempts to find expanded compositions that are biodegradable, reasonably competitive in price with commodity plastics such as polyethylene or polystyrene, but which are more environmentally friendly and which have adequate moisture resistant properties, continue to be made.

SUMMARY OF THE INVENTION

In one aspect of the present invention, a composition comprises a synthetic polymer and a natural polymer. The synthetic polymer includes a water insoluble, biodegradable hydroxy-functional polyester. The natural polymer preferably is starch or a modified starch in gelatinized form. This composition is usefully subjected to an expansion process whereby an expansion agent (e.g. water) and a nucleating agent cause bubbles, or cells, to form, which results in desired expanded articles. The composition is thus usually referred to as a "precursor" composition. Thus, precursor compositions of this invention are admixtures of two essential components: hydroxy-functional polyester and natural polymer, such as starch, preferably in the form of gelatinized starch.

The hydroxy-functional polyesters with which inventive precursor compositions and expanded articles may be formed show a remarkable compatibility with natural polymers, such as starch and modified starch. and expanded articles therefrom are water resistant. For example, inventive foamed articles have shown no substantial disintegration when immersed in water at ambient conditions for at least about 30 minutes.

An embodiment of the invention is where the precursor composition is a molten admixture which, is the presence of an expanding agent and a nucleating agent, may be extruded as a resilient, compressible, low density, substantially closed cell matrix. This compressible and resilient matrix may be the desired end result article (e.g. packaging "peanuts") or may be further processed to form desired articles, particularly by a thermoforming technique such as molding. Molded articles have exterior surfaces with sufficient resistance to moisture as to be suitable for packaging materials with a liquid component, such as hot (moisture emitting) take-out foods.

Thus, another aspect of the invention is an article comprising a compressible and resilient body. The body includes two biodegradable components. The first component is preferably starch or a modified starch. The second component is a water insoluble, synthetic polymer, preferably a hydroxy-functional polyester, such as a poly(hydroxyester) or a poly(hydroxyester ether). The body has an exterior surface where the synthetic polymer predominants and conveys water resistance. The interior has the starch component predominating.

Representative chemical structures for suitable hydroxy-functional polyesters in practicing this invention are preferably represented by Formula A (where n provides a sufficient molecular weight, such as for example a m.w. of about 50,000–100,000). Higher molecular weights are preferred due to higher strength.

FORMULA A

In Formula A each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Suitable polyesters have repeating units represented by Formula B (where each of $R^1$, $R^2$, $R^3$, x, and y are as defined above).

FORMULA B

As earlier described, the body has the synthetic polymer predominating at an exterior surface, whereas the starch component predominates in the interior. Such an article is particularly useful as a packaging material where moisture resistance is desired.

The preferred starch component is derived from a gelatinized starch or a gelatinized modified starch. By "modified" is meant that the starch can be derivatized or modified by typical processes known in the art (e.g. esterification, etherification, oxidation, acid hydrolysis, cross-linking and enzyme conversion). Thus, for example, a modified starch may be a starch ester, a starch ether, or a crosslinked starch. Conventional modifications of starch are described in publications such as *Starch: Chemistry and Technology*, 2d edition, editor Whistler et al., and *Starch Derivatives: Production and Uses*, Rutenberg et al., Academic Press, Inc. 1984.

One preferred embodiment precursor composition had 10 wt. % of a hydroxy-containing polyester, 89 wt. % gelatinized starch and water (where about 17 wt. % of the total composition was water), and 1 wt. % nucleating agent, which was expanded in a pilot scale twin screw extruder. This resulted in expanded articles with a bulk density of about 0.64 lb/ft$^3$ (2.5×10$^{-2}$ g/cm$^3$), a resilience of about 64% and a compressibility of about 0.10 MPa. These expanded articles were tested for moisture resistance. Even after being immersed in water at room temperature and stirred with a magnetic stirring bar at 200 rpm for 30 minutes, the water remained clear, which indicated that no substantial disintegration of the articles had occurred.

Other advantages and aspects of the present invention will become apparent upon reading the specification and the appended claims.

DETAILED DESCRIPTION OF THE PREFERRED EMBODIMENTS

Broadly, precursor compositions of present invention include two essential components: the first component is a synthetic, water-insoluble biodegradable polymer, preferably an hydroxy-functional polyester; and, the second component is a natural polymer, preferably a starch or modified starch in gelatinized form.

These two essential components may be present in varying amounts, although the natural polymer in the total precursor composition and in resulting expanded articles following extrusion will be present as greater than 50 wt. % of the total, preferably be greater than about 70 wt. % of total, and most preferably be up to about 97 wt. % of total. The synthetic polymer will be present in minor amounts, such as from a few weight percent up to about 30 wt. % of the total. Particularly preferred ranges of the synthetic polymer in foamed articles will be about 5–10 wt. %. Each of the components suitable for preparing compositions of the invention will now be more fully described.

Suitable Hydroxy-Functional Polyesters

Useful biodegradable, water insoluble, synthetic polymers for use in inventive compositions and expanded articles include hydroxy-functional polyesters, which may be prepared from base-catalyzed nucleophilic addition of suitable acids to epoxies. This reaction generates both an ester linkage and a pendent hydroxyl group. Transesterification and cross linking reactions are eliminated through use of quaternary ammonium halide salts as initiators for the reaction of diacids with diglycidyl ethers, providing convenient preparation of high molecular weight, thermoplastic, hydroxy-functional polyesters in ether solvents at temperatures from 80° C.–160° C. The preparation and structures for such hydroxy-functional polyesters suitable in practicing this invention may be as described by U.S. Pat. No. 5,171, 820, inventors Mang and White, issued Dec. 15, 1992, which is hereby incorporated in its entirety by reference.

Data provided by the Dow Chemical Company (manufacturer of hydroxy-functional polyesters such as described by U.S. Pat. No. 5,171,820) indicates the biodegradable nature of these polymers through the ability of various soil bacteria (such as *Pseudomonas putida*) to use the synthetic polymers as a substrate for cell culture growth.

Representative structures for suitable hydroxy-functional polyesters in practicing this invention are preferably represented by Formula A (where n provides a sufficient molecular weight, such as for example a m.w. of about 50,000–100, 000). Higher molecular weights are preferred due to higher strength.

FORMULA A

In Formula A each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Thus, suitable polyesters have repeating units represented by Formula B (where each of $R^1$, $R^2$, $R^3$, x, and y are as defined above).

FORMULA B invention, are sometimes hereinafter designated "BIS CHD," "BIS Adipic," "HQ DDCA" and "BIS DDCA." Repeating unit structures for these four illustrative hydroxy-functional polyesters are illustrated by Formulas C–F and several of their properties of interest for the invention are summarized in Table A.

FORMULA C

FORMULA D

FORMULA E

FORMULA F

Particularly preferred such polyesters are prepared from diglycidyl esters of an aliphatic diacid such as adipic due to the ready availability and reasonable price for adipic acid as a source of reactant. Other particularly preferred polyesters may be prepared from dihydric phenols, such as hydroquinone.

Four particularly preferred hydroxy-functional polyesters, used extensively to illustrate (but not to limit) the present In the Formulas C–F, "n" preferably is as earlier described.

TABLE A

| Hydroxy-Functional Polyester Components | Tg (° C.) |
|---|---|
| BIS CHD | 66 |
| BIS Adipic | 45 |

TABLE A-continued

| Hydroxy-Functional Polyester Components | Tg (° C.) |
| --- | --- |
| HQ DDCA | 10 |
| BIS DDCA | 20 |

Natural Polymers

Among the natural polymers suitable and preferred for practicing this invention is starch. Starch is a low-cost and abundant natural polymer composed of amylose and amylopectin. Amylose is essentially a linear polymer having a molecular weight in the range of 100,000–500,000, whereas amylopectin is a highly branched polymer having a molecular weight of up to several million. Unmodified, natural starches are obtained in granular form and may be derived from cereals or grains (such as corn, wheat, rice and sorghum), roots (such as cassava), legumes (such as peas), and tubers such as potato and canna. While less preferred, flours whose contents are predominately starch, and which may also contain protein, oil and fiber, are operative in the invention.

When starch is said to be "gelatinized" it has melted and lost its crystalline state. The starch molecules have taken on a random, disordered configuration and the starch chains have become entangled. Thus, when the gelatinized starch is admixed with the synthetic polymer under extrusion conditions so that the entire admixture is molten, the two molten polymers (natural polymer and synthetic polymer) would be expected to be homogeneously dispersed throughout the body of the extrudate in the respective proportions of each component; however, this does not occur for practice of the invention. Instead, the synthetic polymer has been found to partition so as to predominate along exterior surfaces of the extruded body and to remain as the predominate component along exterior surfaces of further processed (e.g. thermoformed) articles. This is a desirable property since the synthetic polymer is water insoluble and thus conveys resistance to water for articles ultimately formed from the inventive precursor compositions.

Derivatized (modified) starches are also suitable for use in this invention. By "derivatized starches" is meant to include starches which have been chemically treated so as to form starch esters, starch ethers, and crosslinked starches. By "modified" is meant that the starch can be derivatized or modified by typical processes known in the art (e.g. esterification, etherification, oxidation, acid hydrolysis, cross-linking and enzyme conversion). Typically, modified starches include esters, such as the acetate ester of dicarboxylic acids/anhydrides. Particularly useful are the alkenylsuccinic acids, and hydrides, ethers (such as the hydroxyethyl and hydroxypropyl starches), starches oxidized with hypochlorite, starches reacted with cross-linking agents such as phosphorus oxychloride, epichlorhydrin, hydrophobic cationic epoxides, and phosphate derivatives prepared by reaction with sodium or potassium orthophosphate or tripolyphosphate and combinations thereof. These and other conventional modifications of starch are described in publications such as *Starch: Chemistry and Technology*, 2d edition, editor Whistler et al., and *Starch Derivatives: Production and Uses*, Rutenberg et al., Academic Press, Inc. 1984.

For example, starch esters may be prepared using a wide variety of anhydrides, organic acids, acid chlorides, or other esterification reagents. Examples of anhydrides are acetic, propionic, butyric, and so forth. Further, the degree of esterification can vary as desired, such as from one to three per glucosidic unit of the starch, or as appropriate given the number of hydroxyl groups in the monomeric unit of the natural polymer, if selected to be other than starch. Similar or different esterified natural polymers, with varying degrees of esterification, can be blended together for practicing the invention. Although esterified starches are stable to attack by amylases, in the environment the esterified starches are attached by microorganisms secreting esterases which hydrolyze the ester linkage.

Starch esters tend to be hydrophobic in contrast to starch raw materials (that is, derived by usual techniques from natural sources such as corn). Thus, depending upon the particular application, one may prefer to choose an hydrophobic starch ester rather than a hydrophilic starch in formulating compositions of the invention.

Starches are preferred for use as the natural polymers, particularly due to ready availability and low cost.

Other Components

Extrudates from the inventive precursor compositions have substantially closed cell structures with good resilience and compressibility. Expansion, or foaming, is achieved from the precursor compositions in molten form. Precursor compositions of the invention will typically be processed in a suitable apparatus, such as a single screw extruder or a twin screw extruder as are well known in the food science field. Food extruders can be regarded as high temperature, short time reactors, in which granule starch having a moisture content of roughly 10–25% is first compressed into a dense, compact solid and then is converted into a molten, amorous mass by the high pressure, heat, and mechanical sheer forces encountered during processing. Starch extrudates tend to expand upon exiting the extruder die. As earlier noted, Shogren et al., supra, describe starch extrusion and cite a number of reviews related to food processing. Twin screw extruders tend to be more expensive, but permit the addition of water as an expanding agent during the processing. This means that the precursor composition fed into a twin screw extruder need not have the starch in a pre-gelatinized form, since starch gelatinization can occur during the extrusion process itself as water is added. Thus, water can serve both as a gelatinizing agent for the natural polymer as well as an expanding agent for the precursor composition.

When one uses a single screw extruder, then normally the precursor composition will have the starch already gelatinized. A precursor composition in which the starch component is to be gelatinized will typically have water present in a range of about 25 wt. % to 30 wt. % with respect to total composition. Water, of course, is the usual liquid in which starch is gelatinized and its role in the gelatinization can be viewed as one of plasticizer. While water is preferred, other gelatinizing agents, or plasticizers, can be used, for example, such as urea or glycerol.

When water is also used as an expanding agent, then it is normally present in a precursor composition in a range of about 15 wt. % to 20 wt. %, more preferably about 17–18 wt. % of the total precursor composition. Expanding agents other than water are, however, known to the art. For example, U.S. Pat. No. 5,252,271, inventor Jeffs, issued Oct. 12, 1993, describes compositions for forming expanded products that include mild acid and a carbonate source so that the releasing carbon dioxide serves as the expansion agent. Nitrogen or other appropriate agents for the expansion may also be used.

In addition to inclusion of an expansion agent, precursor compositions of the invention may include various other components known to the art. For example, among known components for compositions to be expanded are nucleating agents, which can improve the uniformity of cells formed during expansion and which tend to make the cells smaller. Suitable nucleating agents are well known to the art and include, for example, talc, silicon dioxide, amorous silicates, spray-dried silicon, calcium carbonate, and the like.

Another suitable optional material is a plasticizer (in addition to the gelatinizing agent as already discussed). A plasticizer can be added to inventive compositions to achieve greater material processability and product flexibility, although plasticizers typically soften the compositions in which they are included. This is not always true, however, of compositions of the invention. When incorporated into composition of the invention, the plasticizers preferably are biodegradable. Examples of biodegradable plasticizers include various esters, such as phthalate esters, and various other biodegradable esters known in the chemical arts.

EXPERIMENTAL

Aspects of the invention will now be illustrated, without intending any limitation, by the following examples.

Three important indicia for expanded products useful in packaging applications are bulk density, resiliency, and compressibility. Bulk density values should be on the order of less than about 2 lb/ft$^3$ (less than about 0.032 g/cm$^3$). The method used to determine bulk density in the following experiments was the volume replacement method described by Hwang et al., *Journal of Food Science*, 45, pp. 1400–1407 (1980). Resiliency refers to the ability of a material to recover to its original shape after it has been deformed by a force. Expanded products preferably have a resiliency of at least about 50%, more preferably 60%. Resiliency was determined in the following described experiments using a Stevens LFRA Texture Analyzer employing a cylindrical probe (TA-6, 0.25 inch diameter) run at a probe speed of 0.5 mm/sec and a probe distance of 0.3 mm. Compressibility describes the force necessary to deform a material. Desired compressibility for extruded products are in a range of about 50 to 1000 g/cm$^2$ (0.05 MPa to 1 MPa). Compressibility in the following experiments was determined using the apparatus and conditions as described already in measuring resiliency.

These three properties, particularly bulk density, are influenced not only by the precursor compositions fed into an extrusion apparatus, but also by the size of the extrusion apparatus. The pressures one is able to accommodate during the extrusion process can be significantly higher in commercial size twin screw extruders. Thus, in larger extruders one is normally able to practice at lower temperatures and to achieve lower bulk densities. Most of the following examples were prepared in a laboratory type twin screw extruder or single screw extruder. While the bulk density, resiliency and compressibility properties measured from such extrusions for the invention were acceptable, when precursor compositions of the invention were processed in a larger machine (a Wenger PX 52 Twin Screw Extruder), one saw dramatic decreases in bulk density values. Thus, as is known to persons skilled in the art, commercial sized single or twin screw extruder processing is preferred, since bulk densities can be optimized.

EXAMPLE 1

Precursor compositions of the invention were prepared in two steps. The first step was wherein granules of starch, pellets of hydroxy-containing polyester, and a trace amount of talc (as nucleating agent) were admixed with water. This mixture was agitated, heated, and the starch was gelatinized ("compounding"). This compounding was performed on a Brabender PL 2000 torque rheometer using a mixing screw. The water content was 18–21 wt. % before the compounding. Temperatures during the compounding ranged from about 90° C. to about 135° C. The resultant precursor compositions in which starch was present in gelatinized form were in the initial form of strands, which were then air cooled and pelletized. The pellets were adjusted to about 17 wt. % moisture and then were processed in the second, expansion step.

This second step Was a single screw expansion in which temperatures used in different barrels were in the range of 70° C. to about 210° C. (For example, inventive composition 6 was expanded at 150 rpm with a die temperature of 150° C. and barrels 1, 2, and 3 being, respectively, 70° C., 200° C., and 200° C.) Use, as here, of a single screw extruder tends to lead to higher bulk density for the extrudate. Also, the lower capacity of the apparatus require generally higher temperatures in order to avoid pressure build-up during the extrusion, Nevertheless, as shown by the data summarized in Table 1, generally acceptable properties were obtained for the so-processed inventive extrudates,

TABLE 1

| Inventive Composition | Bulk Density (lb/ft$^3$) | Resilience (%) | Compressibility (MPa) |
|---|---|---|---|
| 1 (94 wt % cornstarch 5 wt % Bis Adipic 1 wt % talc) | 1.35 | 55.2 | 0.1562 |
| 2 ss (89 wt % cornstarch 10 wt % BIS Adipic 1 wt % talc) | 1.70 | 57.7 | 0.1403 |
| 6 (94 wt % cornstarch 5 wt % BIS CHD 1 wt % talc) | 1.15 | 58.6 | 0.1684 |
| 7 (89 wt % cornstarch 10 wt % BIS DDCA 1 wt % talc) | 1.85 | 55.4 | 0.1531 |

EXAMPLE 2

The same formulation summarized in Table 1 as "2 ss" (indicating "single screw" processing) was again prepared as described in the first step of Example 1, but the strands (again pelletized and adjusted to about 17% moisture) were then processed in a Wenger TX-52 Twin Screw Extruder. This extruder is a pilot scale machine, and although not as large as the preferred commercial sized extruders, nevertheless provided a dramatically decreased bulk density (and modestly improved resiliency and compressibility) for expanded products of the same formulation, as shown by the data of Table 2. The extrusion conditions were an rpm of 285, a die temperature of 102° C., and temperatures in barrels 1, 2, and 3, respectively, of 76° C., 140° C., and 135° C.

TABLE 2

| Inventive Composition | Bulk Density (lb/ft³) | Resilience (%) | Compressibility (MPa) |
|---|---|---|---|
| 2 ts (89 wt % cornstarch 10 wt % BIS Adipic 1 wt % talc) | 0.64 | 63.9 | 0.1085 |

EXAMPLE 3

Three inventive formulations were processed in a twin screw extruder in an analogous manner to those runs reported in Table 2 of Example 2, but the extruder used was smaller (a Werner & Pfleiderer ZSK 30 Twin Screw Extruder) operated at temperatures in barrel zones 1, 2, and 3 of 49° C., 93° C., and 140° C. The data are summarized in Table 3.

TABLE 3

| Inventive Composition | Bulk Density (lb/ft³) | Resilience (%) | Compressibility (MPa) |
|---|---|---|---|
| 12 (91.75 wt % corstarch 7.5 wt % Bis Adipic 0.75 wt % talc) | 0.9 | 63 | 0.2011 |
| 13 (94.25 wt % cornstarch 5 wt % BIS Adipic 0.75 wt % talc) | 1.19 | 63.3 | 0.1895 |
| 14 (97.5 wt % cornstarch 2 wt % BIS Adipic 0.5 wt % talc) | 1.77 | 62.7 | 0.3029 |

Comparison of the bulk density values summarized in Table 1 (where bulk density decreased with less resin) to bulk density Values summarized by Table 3 (where bulk density increased with less resin) indicate that the type and size of machine being used for processing and the processing conditions (particularly pressures, temperature, and moisture content) are important factors influencing bulk density. Thus, optimizations of these factors and of resin content will normally be made following empirical determinations from the particular processing machine being used.

EXAMPLE 4

Two inventive precursor compositions were formulated and then were extruded in a manner analogous to that described for Example 3, but the starches were derived from wheat and potato, respectively.

TABLE 4

| Inventive Composition | Bulk Density (lb/ft³) | Resilience (%) | Compressibility (MPa) |
|---|---|---|---|
| 15 (94.5 wt % wheat starch 5 wt % Bis Adipic 0.5 wt % talc) | 1.35 | 60.1 | 0.2635 |
| 16 (94,5 wt % potato 5 wt % BIS Adipic 0.5 wt % talc) | 1.40 | 60.2 | 0.3214 |

EXAMPLE 5

Formulations of cornstarch (85–95%), Bis Adipic polyester (5–15%), and talc (0.5–1%) were prepared and moisture adjusted to about 17%. These compositions were processed in a Wenger TX-52 Twin Screw Extruder fitted with a slit die of 0.3 mm×6 mm. The extrudates of the various compositions were expanded ribbons of about 25–30 mm in width and 10–12 mm in thickness. Sections of the ribbons about 25 cm in length were placed across a mold cavity configured to produce a tray of width 130 mm, length 215 mm, depth 20 mm and a thickness of about 3 mm. The ribbons extended beyond the width and length of the mold cavity. The mold was heated to 100° C. and the mold was closed for about 10 seconds upon opening the mold, the foam ribbons had become compressed and rigid and had assumed the shape of the mold cavity. The rigidity of the thermoformed ribbons increased with increasing polyester content.

This example illustrates practice of the invention for producing thermoformed articles.

EXAMPLE 6

Articles prepared from extruding precursor compositions of the invention were tested to determine wettability (or moisture resistance). These inventive articles were compared to three commercially available packaging materials (in "peanut" form).

A first comparative material was "Eco-Foam" from National Starch and Chemicals (comparative peanut 1). A second comparative product was "Clean-Green" from Clean Green (comparative peanut 2). A third comparative product was "Enpak" from DuPont (comparative peanut 3). The inventive peanut was prepared as described by Example 2. Each of the three comparative and the inventive peanut were placed in a 200 ml flask of water at room temperature and then stirred with a magnetic stir bar at 200 rpm. The comparative peanut 1 started to disintegrate after about 1 minute. The comparative peanut 2 started to disintegrate after 2 minutes 20 seconds. The comparative peanut 3 started to disintegrate after 2 minutes. However, the inventive peanut showed no signs of disintegration after 30 minutes and the water in which it was suspended remained clear. Thus, the inventive peanut was water resistant.

Figure 1:
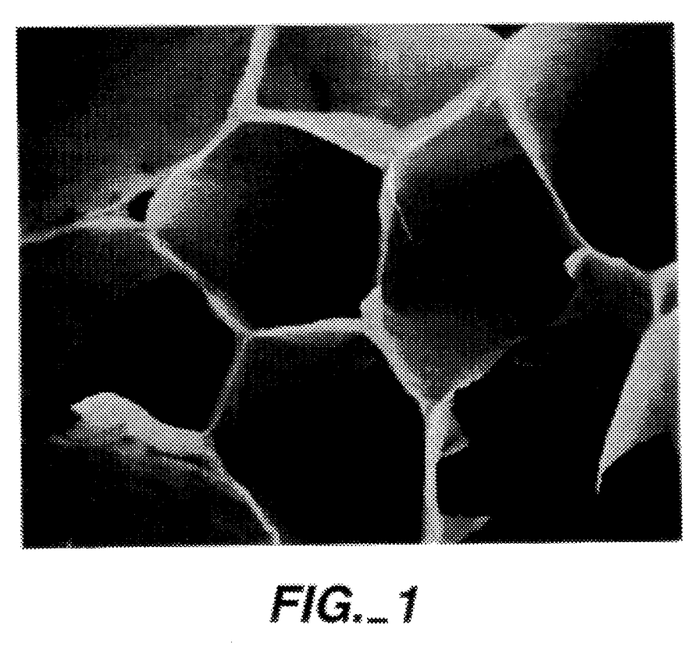
FIG. 1 is a scanning electron micrograph of one inventive embodiment at a magnification of 250.

As illustrated by FIG. 1, a foamed "peanut" of the invention is illustrated in an S.E.M. at a magnification of 250. The majority of cells in the matrix are closed. The cell sizes have a diameter of about 100 μm to about 150 μm.

Foamed articles, or bodies, of the invention have a thin layer of the synthetic polymer predominating on the exterior surface, which conveys water resistance to the articles. This outside layer is observable even on a macroscopic level as conveying a rather smooth surface to the exterior.

It is to be understood that while the invention has been described above in conjunction with preferred specific embodiments, the description and examples are intended to illustrate and not limit the scope of the invention, which is defined by the scope of the appended claims.

It is claimed:

1. An expanded article, comprising:
a compressible, resilient body, the body including two biodegradable components, the first component being starch or a modified starch, the second component being a water insoluble synthetic polymer comprising a hydroxy-functional polyester, wherein the hydroxy-functional polyester has repeating units represented by Formula B:

wherein each of $R^1$ and $R^2$ is individually a divalent organic moiety which is predominately hydrocarbon, each $R^3$ is individually hydrogen or lower alkyl, y is a fraction from 0 to 0.5, and x is a fraction from about 0.05 to about 0.4, the body having an exterior surface and an interior cellular structure, the synthetic polymer predominating at the exterior surface, the starch component predominating in the interior cellular structure.

2. The expanded article as in claim 1 wherein the modified starch is a starch ester, a starch ether, or a crosslinked starch.

3. The expanded article as in claim 1 wherein the body is substantially resistant to dissolution in water at room temperature for at least about 30 minutes.

4. The expanded article as in claim 1 wherein the hydroxy-functional polyester is in an average amount with respect to the body of from about 2 wt. % to less than about 30 wt. %.

* * * * *

UNITED STATES PATENT AND TRADEMARK OFFICE
CERTIFICATE OF CORRECTION

PATENT NO. : 5,665,786
DATED : September 9, 1997
INVENTOR(S) : Wayne Xu et al.

It is certified that error appears in the above-indentified patent and that said Letters Patent is hereby corrected as shown below:

Column 1, Line 13 replace:
"articles, and mole particularly relates to biodegradable" with --articles, and more particularly relates to biodegradable--

Column 2, Line 7 replace:
"Further, the bulk density property from many Of the formu-" with --Further, the bulk density property from many of the formu-

UNITED STATES PATENT AND TRADEMARK OFFICE
CERTIFICATE OF CORRECTION

PATENT NO. : 5,665,786
DATED : September 9, 1997
INVENTOR(S) : Wayne Xu et al.

It is certified that error appears in the above-indentified patent and that said Letters Patent is hereby corrected as shown below:

Column 2, Line 40 replace:
 "composition is a molten admixture which, is the presence of" with --composition is a molten admixture which, in the presence of--

Column 8, Line 31 and Column 9, Line 6 replace:
 "amorous" with

--amorphous--

Column 10, Line 16 replace:
 " This second step Was a single screw expansion in which" with -- This second step was a single screw expansion in which- Signed and Sealed this Twenty-fourth Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,665,786

DATED : September 9, 1997

INVENTOR(S) : Wayne Xu, et al.

It is certified that error appears in the above-identified patent and that said Letters Patent is hereby corrected as shown below:

Title page, item [73], Assignee: should read –The United States of America as represented by the Secretary of Agriculture, Washington, DC; Biotechnology Research and Development Corporation, Peoria, Ill.--

Signed and Sealed this

Ninth Day of June, 1998

*Attest:*

*Attesting Officer*

BRUCE LEHMAN

*Commissioner of Patents and Trademarks*